US012294130B2

(12) United States Patent
Menargues Gomez et al.

(10) Patent No.: US 12,294,130 B2
(45) Date of Patent: May 6, 2025

(54) RADIO-FREQUENCY COMPONENT COMPRISING SEVERAL WAVEGUIDE DEVICES WITH RIDGES

(71) Applicant: SWISSto12 SA, Renens (CH)

(72) Inventors: Esteban Menargues Gomez, Prèverenges (CH); Tomislav Debogovic, Chexbres (CH); Santiago Capdevila Cascante, Renens (CH); Emile de Rijk, Grand-Saconnex (CH)

(73) Assignee: SWISSto 12 SA

( * ) Notice: Subject to any disclaimer, the term of this patent is extended or adjusted under 35 U.S.C. 154(b) by 0 days.

(21) Appl. No.: 18/743,528

(22) Filed: Jun. 14, 2024

(65) Prior Publication Data

US 2024/0332768 A1 Oct. 3, 2024

Related U.S. Application Data

(63) Continuation of application No. 17/276,987, filed as application No. PCT/IB2020/052961 on Mar. 27, 2020, now Pat. No. 12,015,184.

(30) Foreign Application Priority Data

Mar. 28, 2019 (FR) ....................................... 1903303

(51) Int. Cl.
*H01P 1/165* (2006.01)
*H01Q 3/26* (2006.01)
(Continued)

(52) U.S. Cl.
CPC ............... *H01P 1/165* (2013.01); *H01Q 3/26* (2013.01); *H01Q 13/28* (2013.01); *H01Q 15/244* (2013.01)

(58) Field of Classification Search
CPC .. H01P 1/165; H01P 1/17; H01P 1/171; H01P 3/123; H01Q 3/26; H01Q 13/0275; H01Q 13/28; H01Q 15/244
See application file for complete search history.

(56) References Cited

U.S. PATENT DOCUMENTS 4,672,334 A * 6/1987 Saad ......................... H01P 1/17 333/157
4,725,795 A * 2/1988 Ajioka .................... H01P 1/171 333/135
(Continued)

FOREIGN PATENT DOCUMENTS

GB 2076229 A 11/1981
KR 1020060047294 A 5/2006
(Continued)

OTHER PUBLICATIONS

International Search Report for PCT/IB2020/052961 dated Jul. 8, 2020.
Written Opinion for PCT/IB2020/052961 dated Jul. 8, 2020.

*Primary Examiner* — Peter M Bythrow
(74) *Attorney, Agent, or Firm* — McDonald Hopkins LLC

(57) ABSTRACT

Radio-frequency component including several waveguide devices, for example antennas or polarizers, arranged in an array for transmitting and/or receiving electromagnetic signals. The radio-frequency component includes several ridges and each waveguide device includes: at least one inner wall; an upstream opening in the direction of propagation of the signals during emission; and a downstream opening in the direction of propagation of the emitting signals, linked to the upstream opening so that the emitting signals are transmitted from the upstream opening to the downstream opening. The arrangement of the ridges in the openings upstream of the radiofrequency component may be different from the arrangement of the ridges in the openings
(Continued)

downstream of the radio-frequency component. The arrangement of ridges in the downstream openings of each waveguide device includes no more and no less than three ridges.

20 Claims, 13 Drawing Sheets

(51) Int. Cl.
*H01Q 13/28* (2006.01)
*H01Q 15/24* (2006.01)

(56) References Cited

U.S. PATENT DOCUMENTS 5,724,050 A * 3/1998 Tokuda .............. H01Q 13/0208 343/756
6,323,819 B1 * 11/2001 Ergene ............... H01Q 13/0241 343/786
6,417,742 B1 * 7/2002 Enokuma ................ H01P 1/172 333/135
6,522,215 B2 * 2/2003 Enokuma .............. H01P 1/2131 343/756
8,248,178 B2 * 8/2012 Lange ..................... H01P 1/171 333/21 R
9,939,585 B1 * 4/2018 Monte .................. H01Q 21/245
9,972,897 B1 * 5/2018 Rao ...................... H01Q 21/064
2003/0227344 A1 * 12/2003 Kovac ..................... H01P 1/165 333/21 A
2005/0146477 A1 * 7/2005 Kelly .................. H01Q 21/005 343/711
2005/0231436 A1 10/2005 McLean et al.
2011/0133863 A1 * 6/2011 Lange ..................... H01P 1/171 333/21 A
2014/0145893 A1 5/2014 Park et al.
2016/0254582 A1 * 9/2016 Jensen .................... G06F 30/00 343/853
2017/0077610 A1 * 3/2017 Bongard ............ H01Q 13/0233
2017/0141478 A1 * 5/2017 Jensen .................... H01P 1/161
2017/0263991 A1 * 9/2017 Jensen .................... H01P 1/173
2021/0175593 A1 * 6/2021 Tageman ................ H01P 1/208

FOREIGN PATENT DOCUMENTS

KR 1020120136510 A 12/2012
WO 2015134772 A1 9/2015

* cited by examiner

RADIO-FREQUENCY COMPONENT COMPRISING SEVERAL WAVEGUIDE DEVICES WITH RIDGES

TECHNICAL DOMAIN

The present invention relates to a radiofrequency component comprising a plurality of waveguide devices provided with ridges.

BACKGROUND ART

Passive radiofrequency waveguide devices are already known in the prior art, which allow to propagate and manipulate radiofrequency signals without using active electronic components. Passive waveguides can be divided into three distinct categories:

- Devices based on guiding waves inside hollow metal channels, commonly called waveguides.
- Devices based on guiding waves inside dielectric substrates.
- Devices based on guiding waves by means of surface waves on metallic substrates such as PCBs, microstrips, etc.

The present invention relates in particular to components provided with devices according to the first category above. Examples of such devices include waveguides as such, filters, polarizers, antennas, mode converters, etc. . . . They may be used for signal routing, frequency filtering, signal separation or recombination, transmission or reception of signals in or from free space, etc.

For example, the device may consist of a compact antenna, a polarizer, a waveguide, or a set of such elements connected in series.

Antennas are elements that are used to transmit or receive electromagnetic signals in free space. Simple antennas, such as dipoles, have limited performance in terms of gain and directivity. Parabolic antennas allow higher directivity, but are bulky and heavy, making them unsuitable for use in applications such as satellites, for example, where weight and volume must be reduced.

In order to improve these parameters, it is known to group several such waveguide devices together to form a radio frequency component. Thus, direct radiating antennas (DRA) generally combine several radiating elements (elementary antennas) out of phase in order to improve gain and directivity. The signals received on or emitted by the different radiating elements are amplified with variable gains and phase-shifted between them in order to control the shape of the array's receive and transmit lobes. At high frequencies, for example microwave frequencies, the different radiating elements are each connected to a waveguide which transmits the received signal towards the radio frequency electronic modules, respectively which feeds this radiating element with a radio frequency signal to be emitted. The signals transmitted or received by each radiating element can also be separated according to their polarization by means of a polarizer.

Such an arrangement with multiple waveguide devices is also used for example in electronically controlled antennas, array-fed reflector antennas, compact fixed multi-beam antennas, etc.

Such components consisting of many array antenna devices, however, pose particular difficulties of realization. For example, it is desirable to avoid interference between signals transmitted or received by adjacent antennas.

It is also sometimes desirable to reduce the amplitude of undesirable transmission or reception side lobes ("grating lobes").

It is also sometimes desirable to improve the performance of an antenna array in terms of cross-polarization, gain, return loss and/or isolation.

The parameters available to the designer of such a component in order to avoid these perturbations between antennas and side lobes are few. For example, it is sometimes made use of closely adjacent antennas, with a distance d between antennas less than the wavelength A of the signal to be transmitted or received, or even less than $\lambda/2$, which allows to reduce the side lobes. However, such close proximity requires a miniaturization of all parts of the component which is difficult to achieve.

Waveguide devices with one or more ridges on their internal surface are also often used; for example, double ridged antennas, quadruple ridged antennas, etc. are called "double ridged antennas", "quadruple ridged antennas", etc. to designate antennas with two ridges and four ridges respectively. Such ridges make it possible, for example, to adapt the impedance of the devices to that of the other devices of the component, to manufacture more compact and therefore lighter devices with equivalent performance, to control the modes of transmission of electromagnetic signals in the ridged device, and, for example, to avoid the transmission of undesirable modes or those generating significant interference with adjacent devices.

However, the desired arrangement of the ridges downstream of the device is not always desired upstream, and vice versa.

WO2015/134772 discloses in particular a sub-array of a radiofrequency component comprising several waveguide devices. This sub-array may comprise sixteen waveguide devices, which include sixteen septum polarizers, split waveguide ports and radiating elements. The sixteen waveguide devices in the sub-array are arranged in four rows. The septum polarizer of the waveguides of the first and third row have the same first and same orientation, while the septum polarizer of the waveguides of the third and fourth row have the same orientation but rotated 180° from the first orientation.

All septum polarizers are combined by a series of combiners in a common input. The rotation of the septum polarizers allows to have adjacent ports of the same polarization, thus simplifying the combiners.

A major disadvantage of WO2015/134772 is that the single mode bandwidth is limited.

BRIEF SUMMARY OF THE INVENTION

An aim of the present invention is to provide a radiofrequency component, for example a passive radio-frequency component to form the passive part of an antenna array or direct radiating array (DRA), which provides more freedom to the designer to reduce the performance limitations of known radio-frequency components.

Another aim of the present invention is to provide a radio-frequency component with a higher bandwidth.

Another aim of the present invention is to provide a compact radiofrequency component.

Another aim of the present invention is to propose a radio-frequency component that allows to discriminate more easily between the fundamental mode of transmission and the first higher order mode.

According to the invention, these aims are achieved in particular by means of a radiofrequency component comprising several waveguide devices, for example antennas or polarizers, arranged in an array and intended to transmit and/or receive electromagnetic signals, the radiofrequency component comprising several ridges, each waveguide device having:

- at least one inner wall;
- an upstream opening in the direction of propagation of said emitting signals;
- a downstream opening in said direction of propagation of said emitting signals, linked to said upstream opening so that said emitting signals are transmitted from said upstream opening to said downstream opening, and/or vice versa in reception;
- and wherein the arrangement of ridges in the downstream opening of each waveguide device comprises not more and not less than three ridges.

The use of ridges allows the transmission of a preferred mode of transmission in a compact device.

Surprisingly, the use of three ridges in the downstream openings significantly increases the single-mode bandwidth of each waveguide device.

In a preferred embodiment, the arrangement of the ridges in the openings upstream of the RF component is different from the arrangement of the ridges in the openings downstream of the RF component.

The possibility to provide different upstream and downstream ridges offers additional freedom when designing the component, for example to change the polarization and/or phase shift of the signal within a device, or between different devices of the same component.

The component can be a polarizer with a septum, for example a septum of variable height forming stair steps.

For example, the septum can be used to create a circular polarization. Septa can also be used to combine two orthogonal polarizations.

The arrangement of the different upstream and downstream ridges allows to maintain this circular polarization in a stable way and in a compact waveguide.

The arrangement of the ridges in the downstream openings of the different devices may be different.

For example, if the devices have antennas, the arrangement of the upstream ridges can be arranged in such a way as to facilitate the coupling with the active electronic circuits.

The arrangement of the downstream ridges may be different between the different antennas, in order to reduce the mutual coupling between signals transmitted or received by the different antennas.

The number of ridges upstream of at least one device may be different from the number of ridges in the downstream opening of that device. For example, the component may include one or more waveguides that are ridged downstream but not upstream.

The angular space between the different ridges of the upstream opening of a device can be different from the angular space between the ridges of the downstream opening of this device. For example, the component may comprise one or more waveguides whose upstream ridges are spaced at an angle $\alpha$ and whose downstream ridges are spaced at an angle $\beta$ different from $\alpha$.

The component may comprise one or more devices with a curved ridge.

A curved ridge, for example, allows the position of the ridges to be rearranged in such a way that the ridges are positioned differently between upstream and downstream.

At least one of the curved ridges may have two curved walls that are nevertheless parallel to each other.

The height of at least one of the ridges may be constant.

The height of at least one of the ridges can be variable. The height of at least one of the ridges of at least one said device may vary progressively over at least a portion of the length of that ridge.

At least one of the curved ridges may lead into said downstream opening and into said upstream opening in radial planes.

The radial position of the ridge(s) of the upstream opening of at least one said device may be different from the radial position of the three ridges of the downstream opening of that device.

The external section of at least one of said devices may be identical upstream and downstream.

In an embodiment, each device comprises a single upstream opening and a single downstream opening.

The radiofrequency component comprises a plurality of said devices, the upstream openings of the different devices being in one plane, the downstream openings of the different devices being in a second plane parallel to the first plane.

The radio-frequency component comprises a plurality of said devices, each device comprising a waveguide and an antenna with an opening linked to this waveguide and intended to transmit and/or receive electromagnetic signals,

- each antenna defining a said downstream aperture,
- each antenna has at least one inner wall with three ridges at the downstream opening,
- the orientation of the three ridges between adjacent antennas being phase-shifted.

This phase shift allows, for example, to control interference between signals transmitted or received by adjacent antennas.

According to one aspect, an object of the invention is also a radiofrequency component comprising an array of antennas, each antenna being at least partially surrounded by a rim in order to minimize mutual coupling between antennas.

According to one aspect, an object of the invention is also a radiofrequency component comprising an antenna array, said antennas progressively widening in the downstream direction by forming several steps. This improves the performance of the array in terms of return losses and bandwidth.

According to one aspect, an object of the invention is also a radiofrequency component comprising a ridged antenna array, the height of said ridges progressively reducing in the downstream direction by forming several steps. This improves the performance of the array in terms of return losses and bandwidth.

BRIEF DESCRIPTION OF THE FIGURES

Examples of implementation of the invention are indicated in the description illustrated by the annexed figures in which.

EXAMPLE(S) OF EMBODIMENTS OF THE INVENTION

Figure 16:
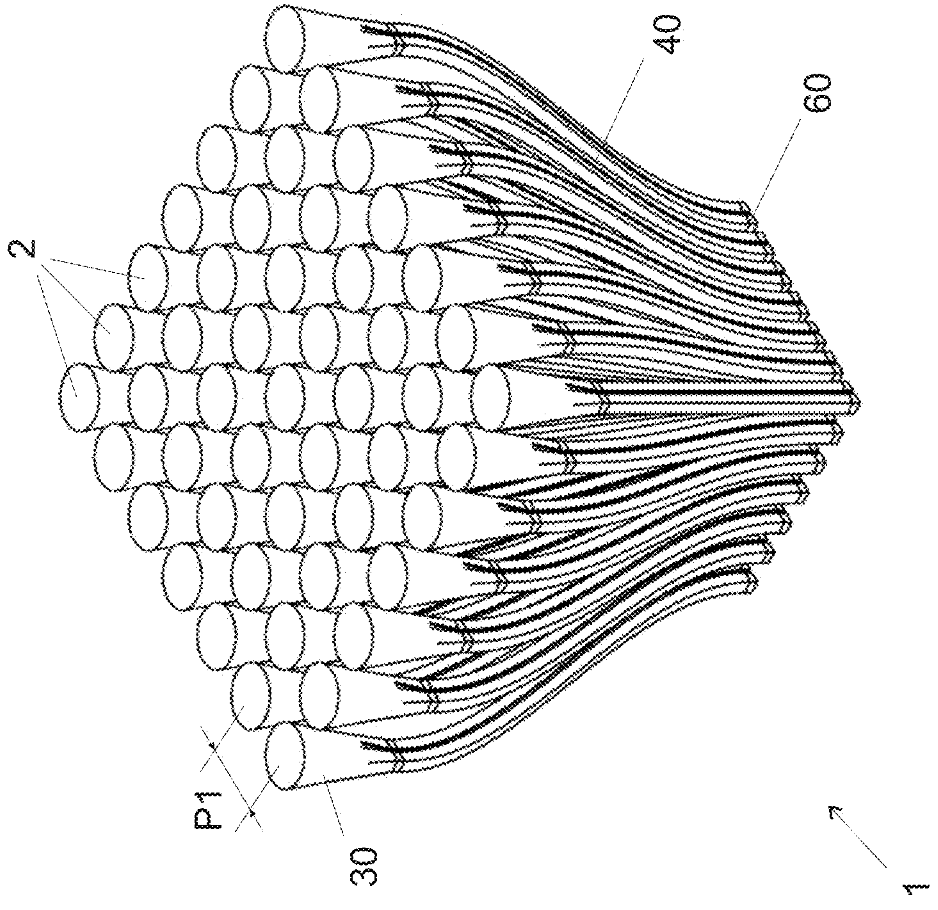
FIG. 16 shows an example of a component according to the invention, with radiating elements spaced further apart than the entry ports.

FIG. 16 shows an example of a component 1 comprising several waveguide devices 2. In this example, the component 1 is a passive RF module intended to form the passive part of a direct radiating array (DRA).

The RF module 1 comprises a plurality of devices, each device comprising for example four layers from the top to the bottom of the figure.

Among these layers, the first layer at the top of the figure consists of a radiating element 30 (antennas) for emitting electromagnetic signals into ether, respectively for receiving the received signals. This layer is downstream of the component.

The second layer comprises a waveguide 40.

The third layer is optional; it can also be integrated into the second layer. When present, the third layer includes an element such as a polarizer or a section adapter.

The fourth layer at the bottom of the figure (upstream) comprises a waveguide port 60. Each port 60 is an interface to an active element of the DRA, such as an amplifier and/or a phase shifter, which is part of a beamforming array. One port thus allows a waveguide to be connected to an electronic circuit, in order to inject a signal into the waveguides or in the opposite direction to receive electromagnetic signals in the waveguides.

Figure 17:
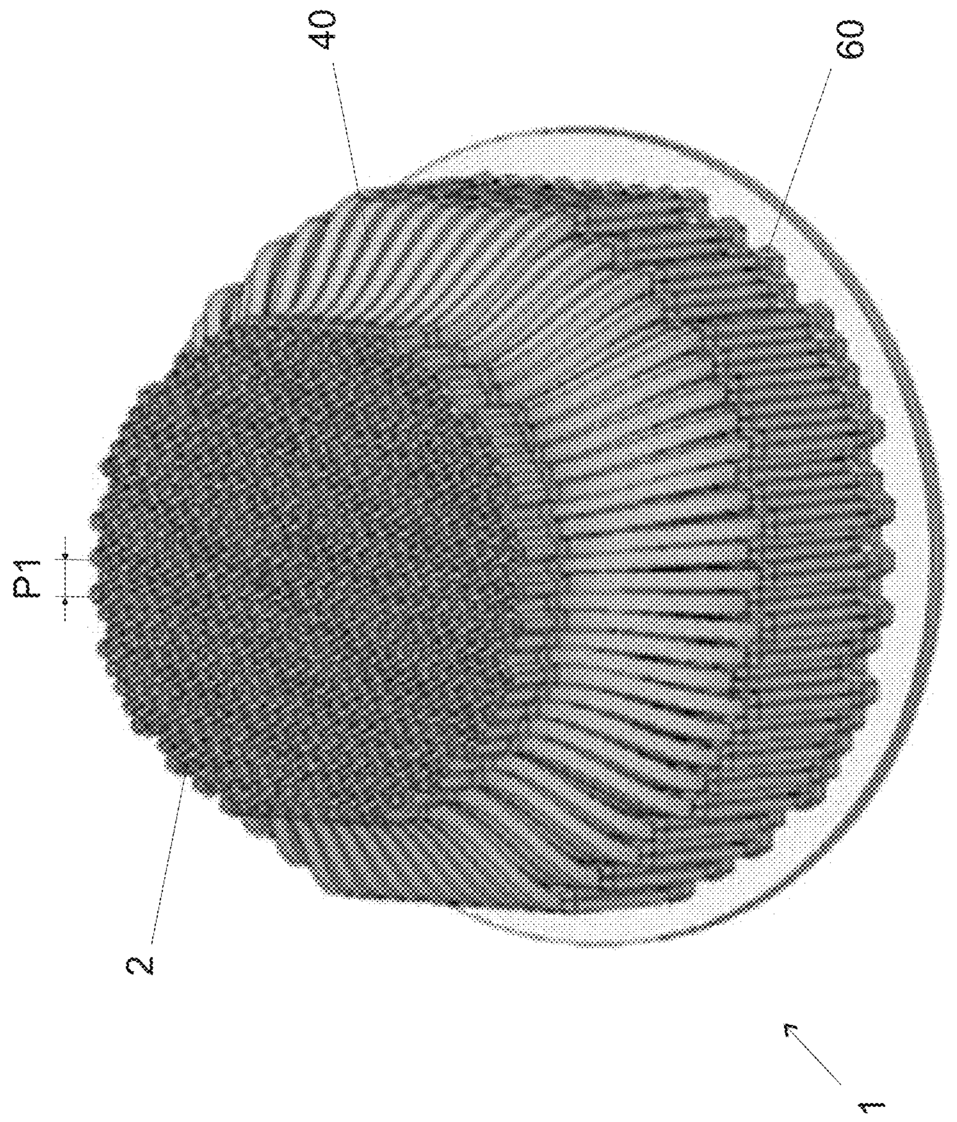
FIG. 17 illustrates an example of a component according to the invention, with radiating elements less spaced than the entry ports.

This module 1 is intended for use in a multi-beam environment. The radiating elements are preferably close together, as shown in FIG. 17 in particular, so that the pitch p1 between two adjacent radiating elements is smaller than the wavelength at the nominal frequency at which the module 1 is intended to be used. This reduces the amplitude of the transmission and reception side lobes.

In FIG. 16, the pitch p1 between two adjacent radiating elements is larger than the pitch between two waveguide ports 60, which allows to create a module with large antennas. It is also possible to use a module in which the pitch p1 between two adjacent radiating elements is equal to or smaller than the pitch between two waveguide ports 60, as in FIG. 17, in order to bring the radiating elements closer to each other without having to use miniaturized active electronics on the ports 60.

The different devices 2 form an array, for example a grid.

The invention aims to optimize each device 2 as such, and to optimize the component 1 by minimizing the disturbances between devices and/or by preventing the defects of the different devices from adding up.

Figure 1:
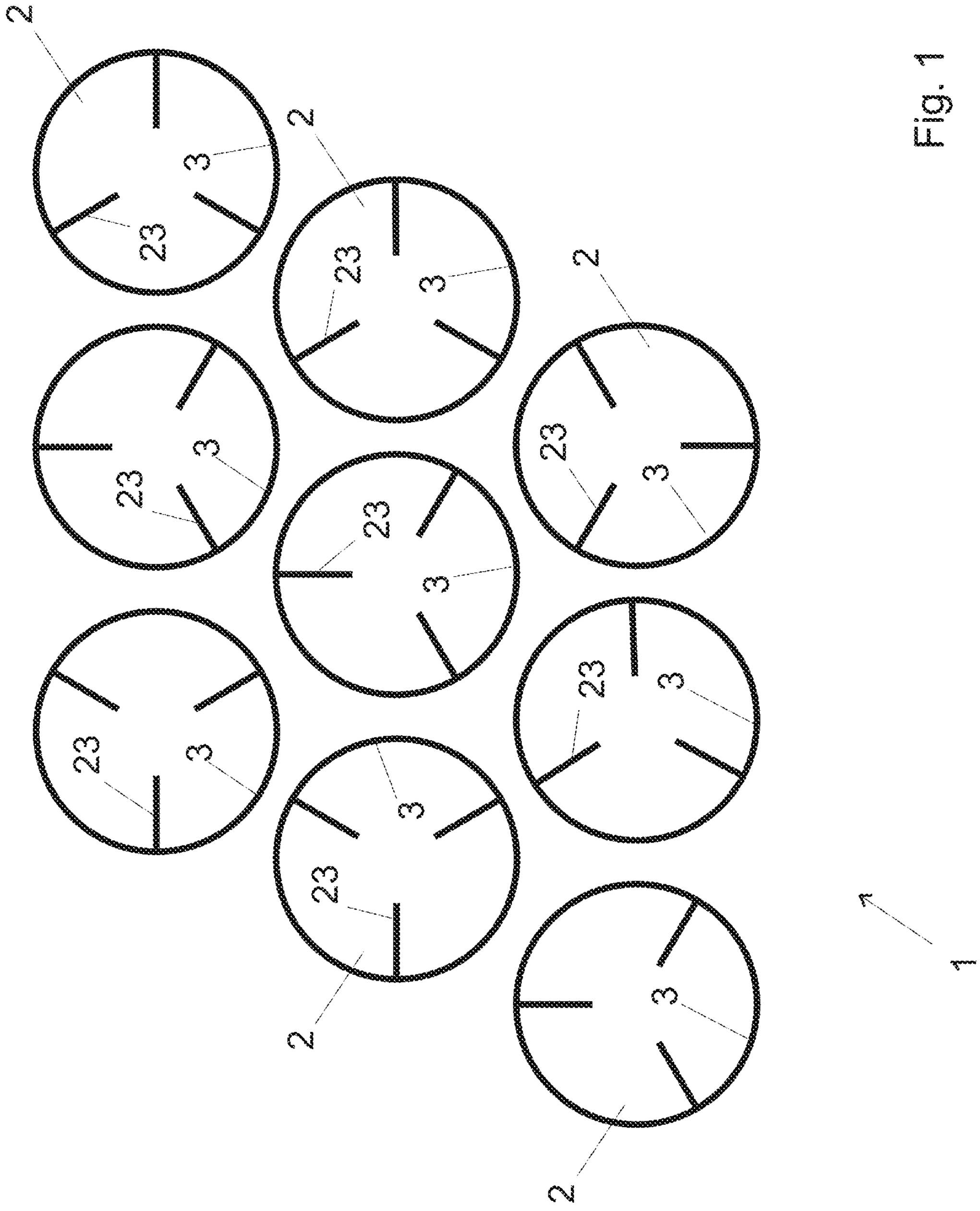
FIG. 1 schematically illustrates the downstream side of a component comprising an antenna array with different orientations.

FIG. 1 schematically illustrates a component 1 seen from the downstream side, i.e. from the radiating elements (antennas) as waveguide devices 2. This component can be used, for example, as a passive part of an DRA antenna similar to the one illustrated in FIG. 16.

The individual devices 2 are arranged in a plane and form a grid array or with position shifts between lines as shown in FIG. 1. The distance between adjacent devices is preferably less than the nominal wavelength of the signal to be transmitted.

The antenna devices shown in this example have a circular downstream opening. Their inner face 3 is provided with three ridges 23 angularly spaced by 120° and parallel to the direction of signal propagation.

Unexpectedly, the use of three ridges in a waveguide with a circular, square or rectangular section has the advantage of favoring the transmission of the fundamental transmission mode, by accentuating the frequency difference between the fundamental mode and the first higher order mode.

Figure 18A:
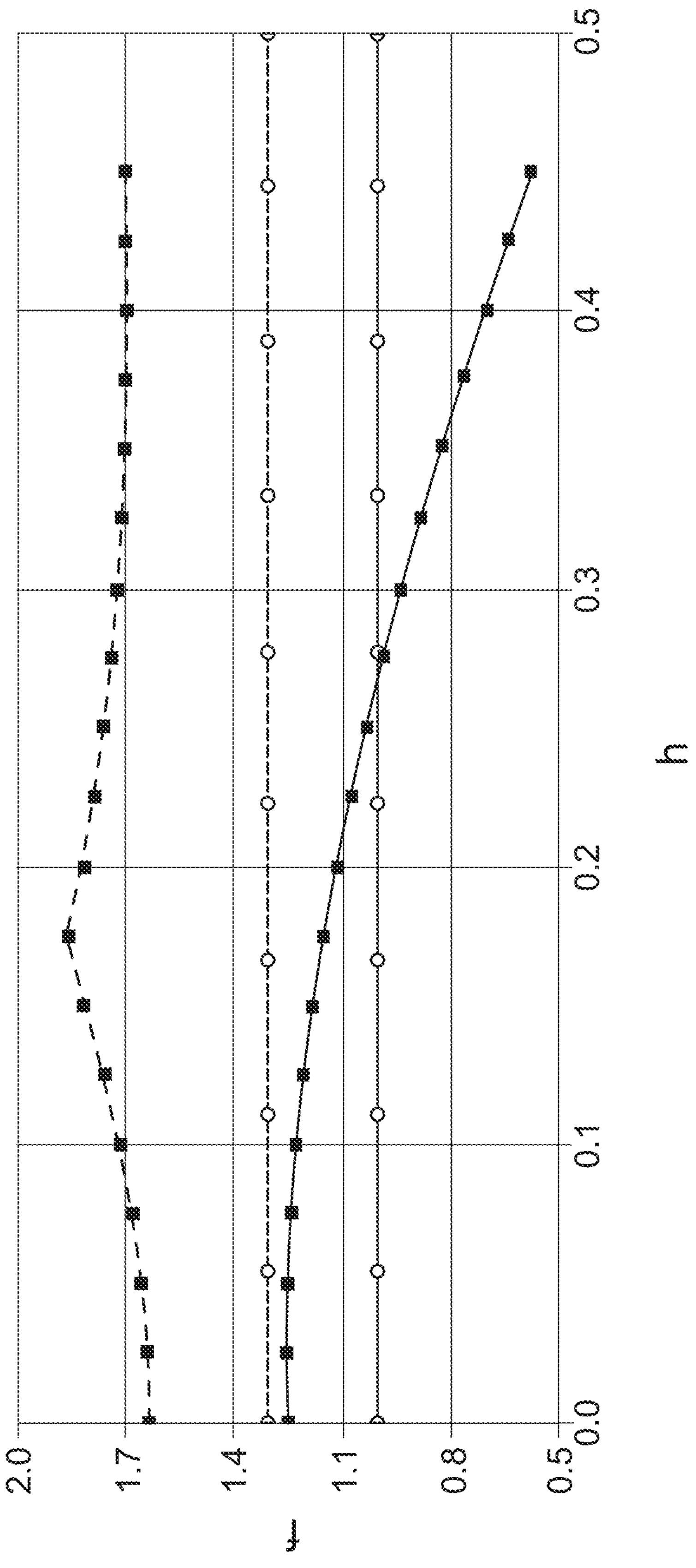
FIG. 18*a* illustrates the evolution of the cut-off frequency of the fundamental mode and of the first higher order mode in a cylindrical waveguide without ridges, respectively with 3 ridges, as a function of the height of the ridge.

FIG. 18*a* illustrates the evolution of the cut-off frequency of the fundamental mode and of the first higher order mode in a cylindrical waveguide without ridges, respectively with 3 ridges, as a function of the ridge height. The x-axis scale represents the normalized ridge height and the y-axis scale represents the normalized frequency. The upper curve (dotted line with solid squares) represents the frequency of the first upper mode as a function of the ridge height h in a waveguide with three ridges. The solid line curve with solid squares represents the frequency of the fundamental mode as a function of the ridge height h. The dotted curve with white circles represents the frequency of the first higher mode in a non-ridged waveguide. The solid line curve with white circles represents the frequency of the fundamental mode in a non-ridged waveguide. As can be seen, the difference in frequency between the fundamental mode and the first higher mode is much larger in a cylindrical waveguide with three ridges than in a cylindrical non-ridged waveguide, making it easier to filter modes other than the fundamental mode.

Figure 18B:
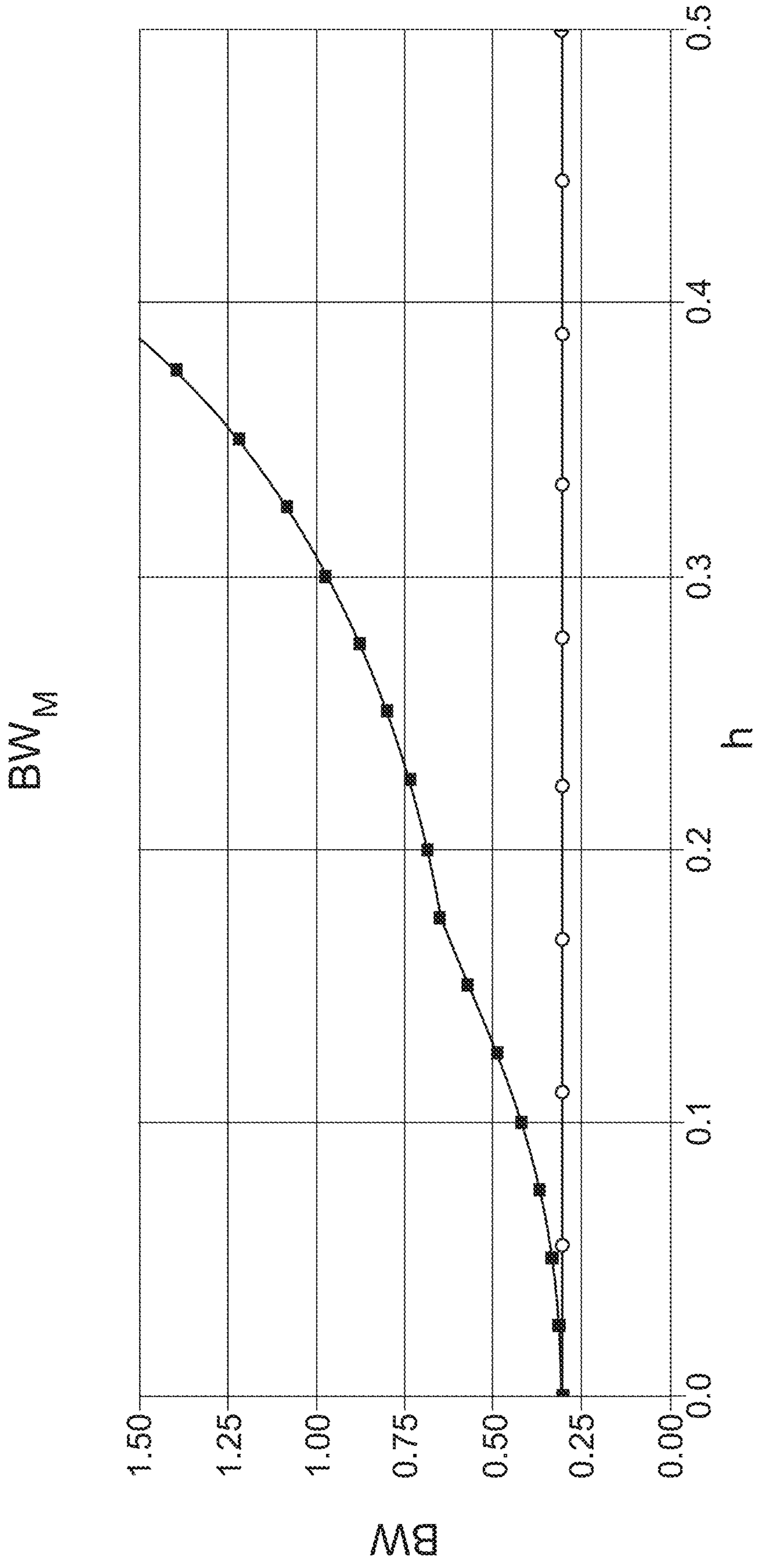
FIG. 18*b* illustrates the relative single mode bandwidth (defined as the ratio between the cut-off frequency of the fundamental mode and that of the first higher order mode) in a cylindrical waveguide without ridges, respectively with 3 ridges, as a function of the ridge height.

The use of waveguides with three ridges also makes it possible to widen the signal bandwidth in single mode. FIG. 18*b* shows the normalized single mode bandwidth as a function of the normalized ridge height for a waveguide with three ridges (curve with solid squares) and for a waveguide without ridges (curve with white circles).

Figure 19A:
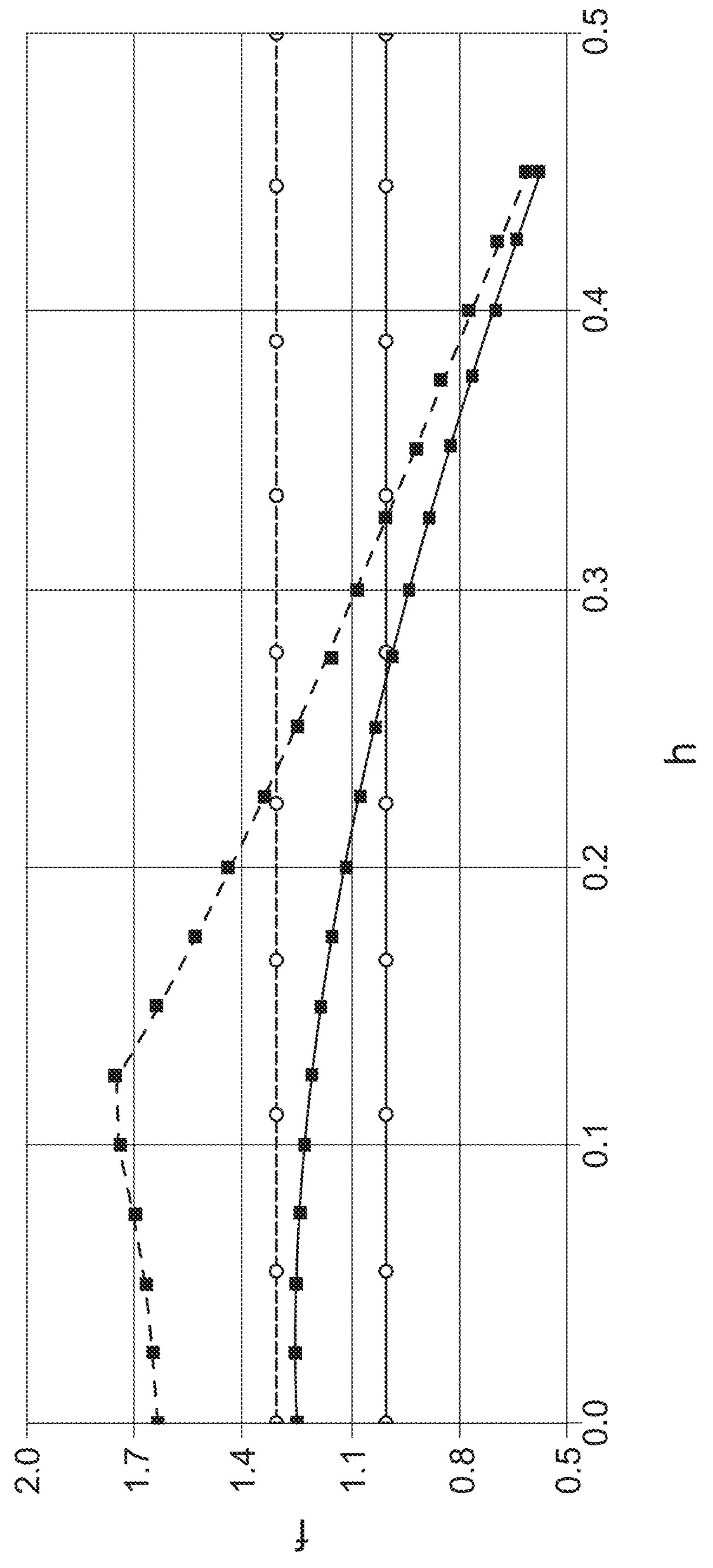
FIG. 19*a* shows the evolution of the cut-off frequency of the fundamental mode and of the first higher order mode in a cylindrical waveguide without ridges, respectively with 4 ridges, as a function of the ridge height.

FIG. 19*a* is comparable to FIG. 18*a*, but illustrates the comparison between a cylindrical waveguide with four ridges (curved with black squares) and a cylindrical waveguide without ridges (curved with white circles). As can be seen, the frequency difference between the fundamental mode (solid curve) and the first higher order mode (dotted-line) is much smaller than in a waveguide with three ridges, especially for large heights of ridge favorable to large bandwidths. The filtering of the first higher order mode is therefore easier in the case of a waveguide with three ridges than in a non-ridged or four ridged waveguide.

Figure 19B:
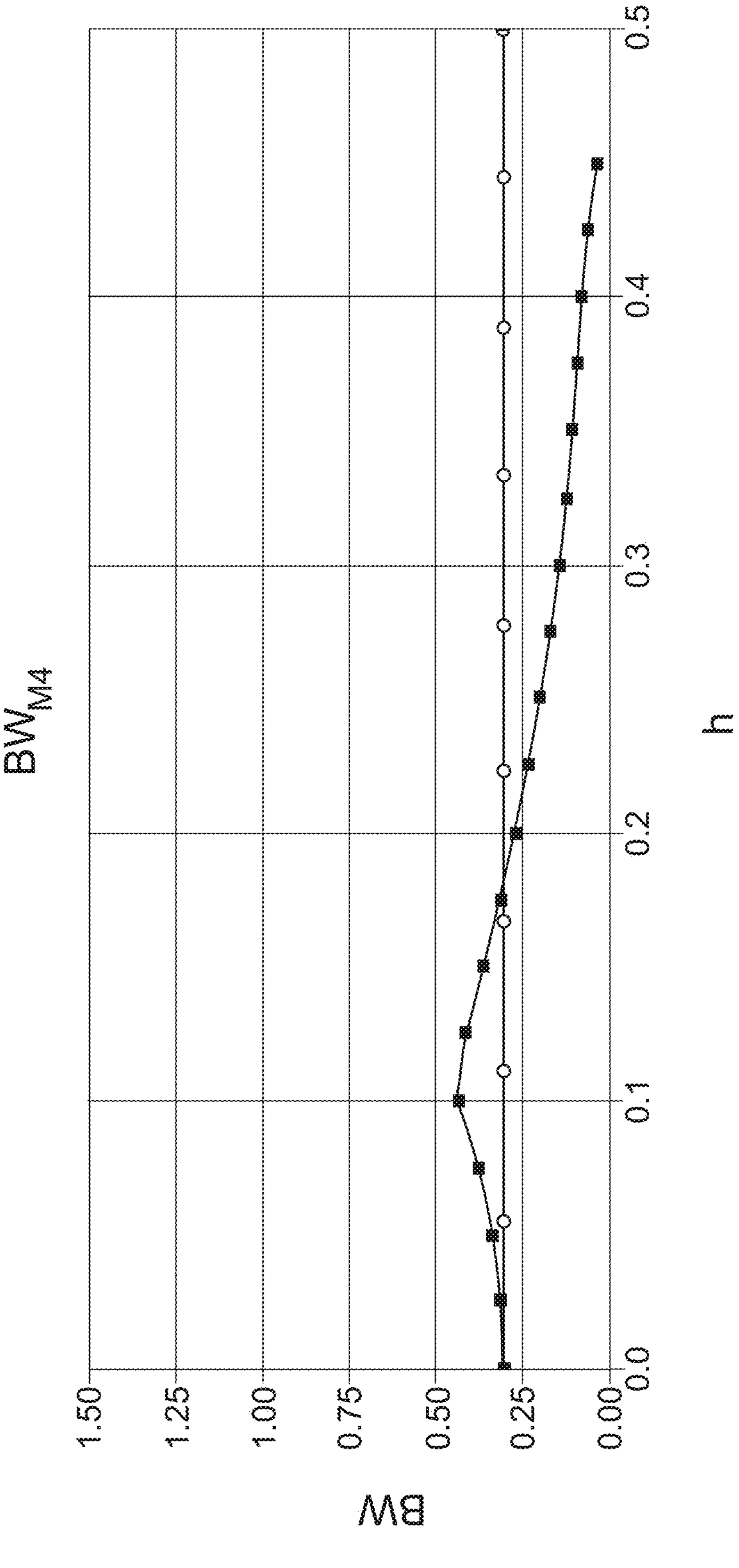
FIG. 19*b* illustrates the relative single mode bandwidth (defined as the ratio between the cut-off frequency of the fundamental mode and that of the first higher order mode) in a cylindrical guide without ridges, respectively with 4 ridges, as a function of the ridge height.

The use of a waveguides with four ridges is also less favorable than the use of waveguides with three ridges in terms of single mode bandwidth. FIG. 19*b* shows the normalized single-mode bandwidth as a function of the normalized ridge height for a waveguide with four ridges (curve with solid squares) and for a waveguide without ridges (curve with white circles). As can be seen, the bandwidth of a waveguide with four ridges is only marginally better than that of a non-ridged waveguide when the ridge height is very low; for higher ridge heights, the bandwidth is lower in single mode than that of a non-ridged cylindrical waveguide, and even significantly lower than that of a waveguide with three ridges as shown in FIG. 18*b*.

Square, rectangular, hexagonal or octagonal section antennas can also be used. Similarly, the number of ridges can be different from three, although three ridges is a preferred embodiment in view of the advantages described above. In particular, all the antennas or waveguide devices described in the rest of this description can be used instead of the antennas shown in this figure.

According to one aspect of the invention, the different waveguide devices 2 are oriented differently, as can be seen with the position of the ridges 23. The angles of rotation between devices can be regular or more random as in this example. These rotations make it possible to add up the imperfections specific to each antenna, which compensate each other by adding up, preferably in a destructive way. This avoids multiplying the imperfections of each device 2 if they were all aligned identically.

Figure 2:
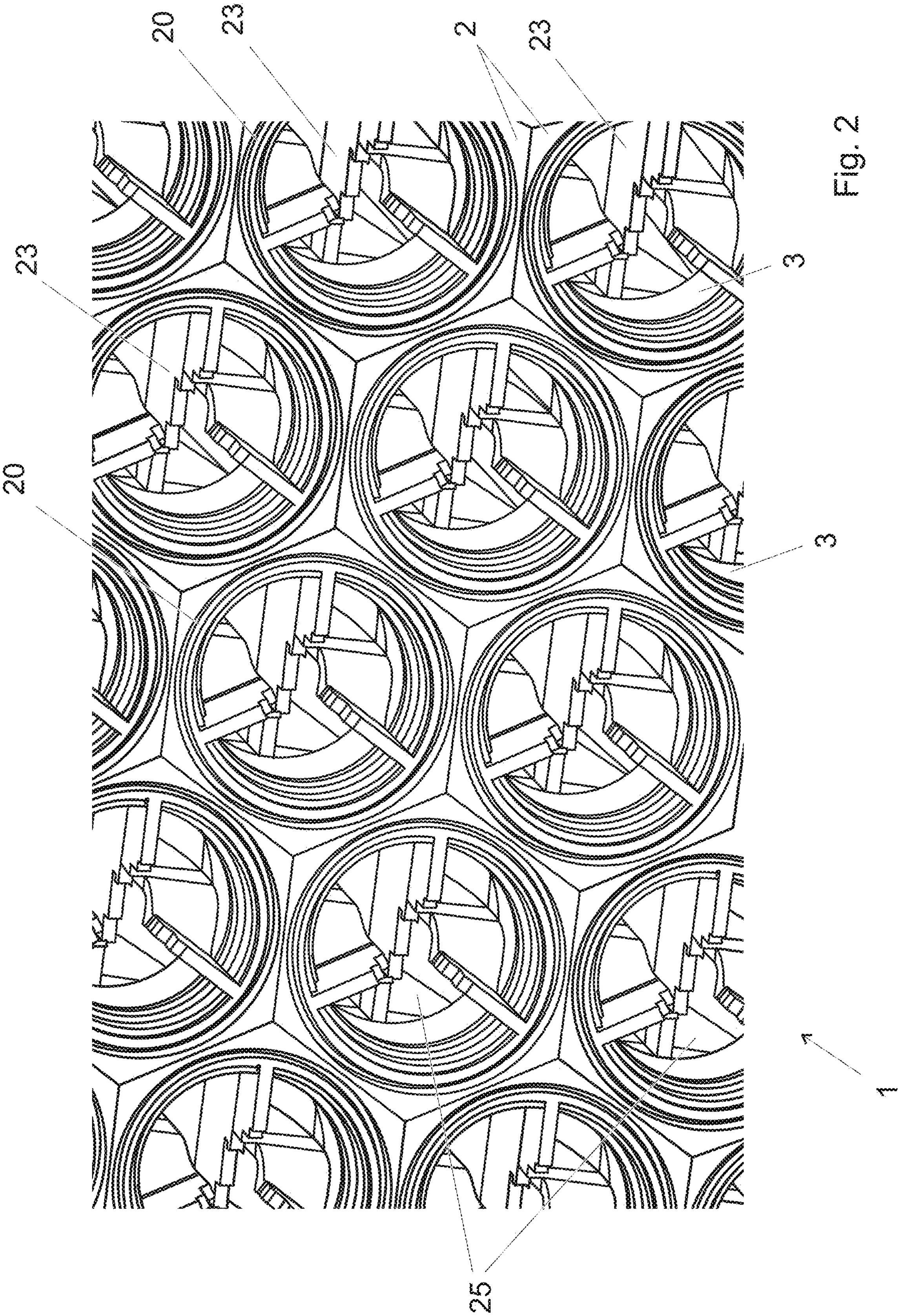
FIG. 2 illustrates a component with an array of antennas with circular openings, each antenna being ridged.
Figure 3:
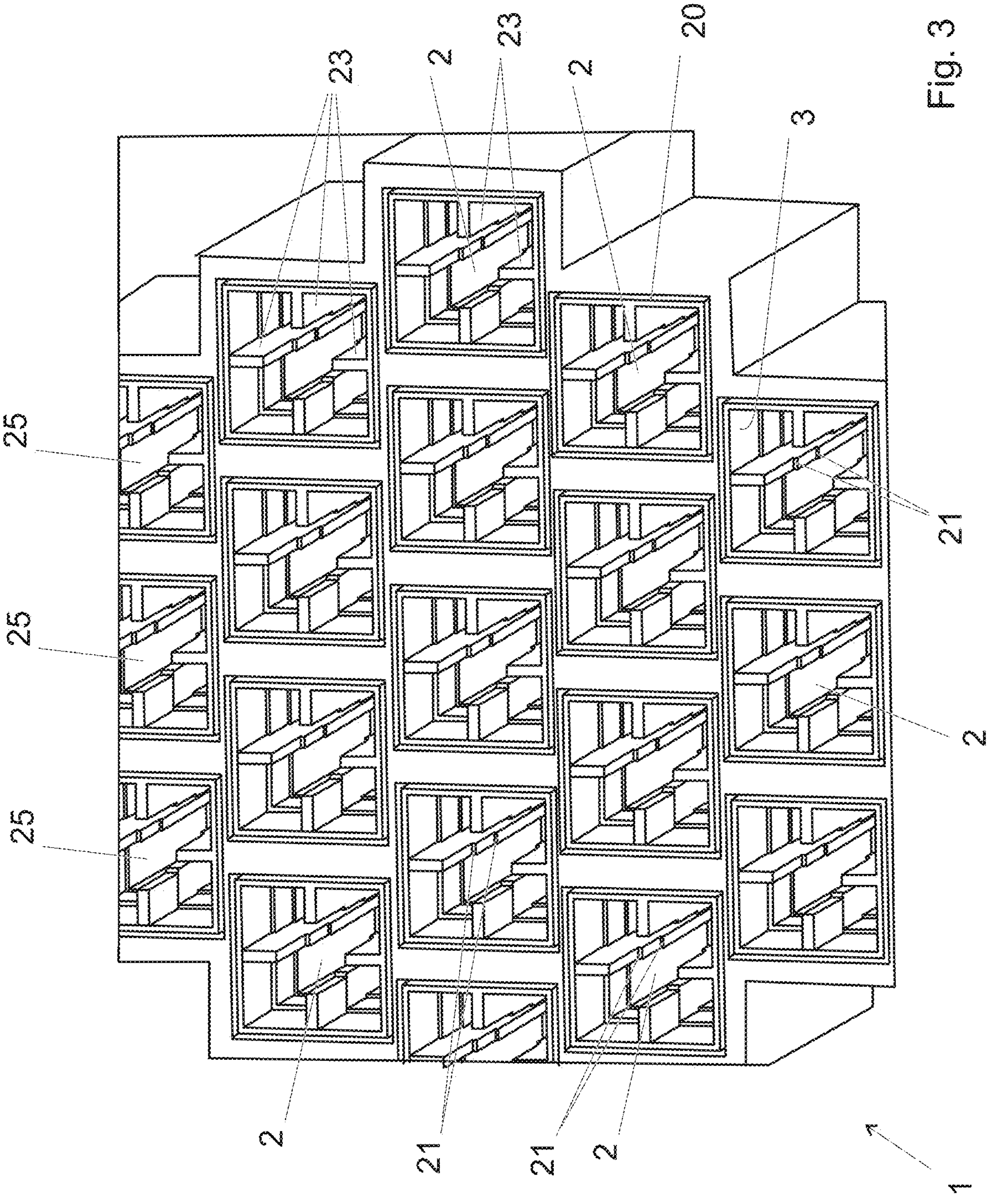
FIG. 3 shows a component with an array of antenna array with a square openings, each antenna being ridged.

FIGS. 2 and 3 illustrate another component 1 comprising several waveguide devices of the type of antenna 2, seen in perspective from the downstream side. The antennas 2 in FIG. 2 have circular downstream openings 25 while those in FIG. 3 have square openings. Other sections can be considered, for example rectangular, hexagonal, octagonal, elliptical, semi-circular, semi-elliptical, etc. The antennas are arranged in an array in a single plane, with a triangular arrangement; other arrangements, for example grid arrangements, may be considered.

One or more ribs form a rim 20 that at least partially surrounds each antenna. This rim reduces the mutual coupling between antennas 2, thus improving the performance of the array.

Antennas 2 have an opening whose section widens progressively towards the downstream direction, forming one or more steps 21. These steps reduce return losses and improve performance in terms of bandwidth. The septum also forms the desired downstream polarization.

Antennas 2 are provided with at least one septum 26 in order to generate respectively to discriminate between two signals with linear or circular polarizations orthogonal to each other.

Each antenna can be provided with several septa to create one or two circular polarizations, or to combine two linear polarizations, which allows for example to protect active antennas with linear polarizations. It is also possible to provide antennas with several septa to create elliptical polarizations.

Each antenna can be provided with one or more ridges, the height of which is progressively reduced in the downstream direction, forming one or more steps. These steps help to reduce return losses and improve performance in terms of bandwidth.

In FIG. 2, the antennas are provided with two ridges, two of which are curved, i.e. they do not extend exclusively in radial planes.

Figure 6:
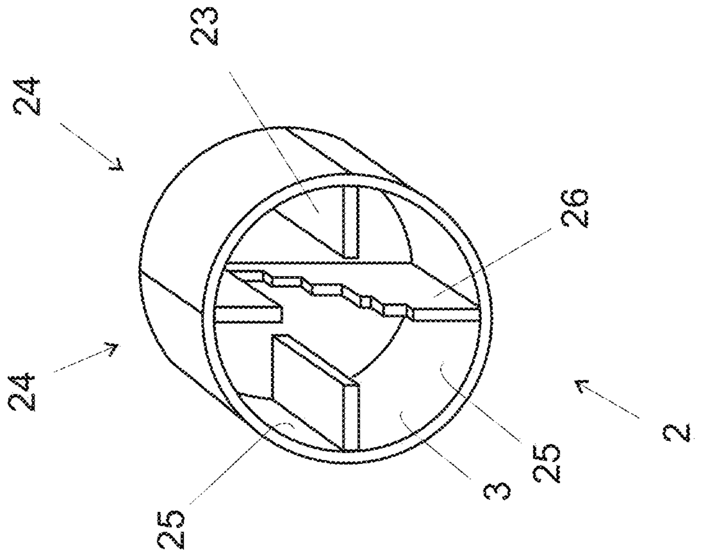
FIG. 6 illustrates a section of a waveguide device according to an aspect of the invention, having a circular cross-section and forming two upstream ridged waveguides converging into a single downstream waveguide with four ridges.
Figure 5:
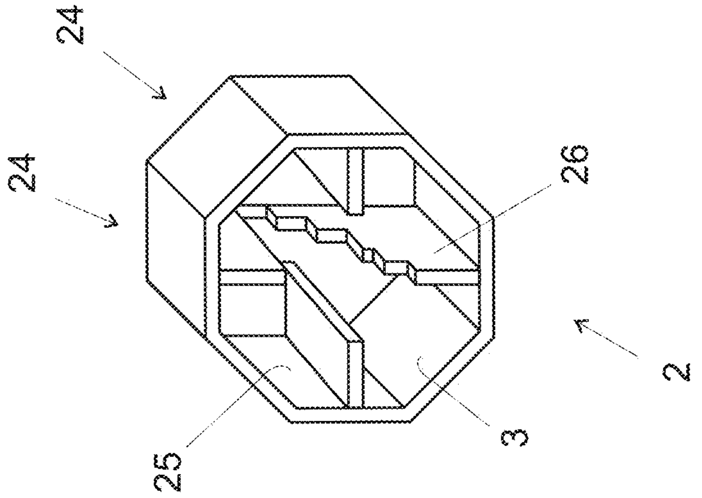
FIG. 5 illustrates a section of a waveguide device according to an aspect of the invention, having an octagonal cross-section and forming two upstream ridged waveguides converging into a single downstream waveguide with four ridges.
Figure 4:
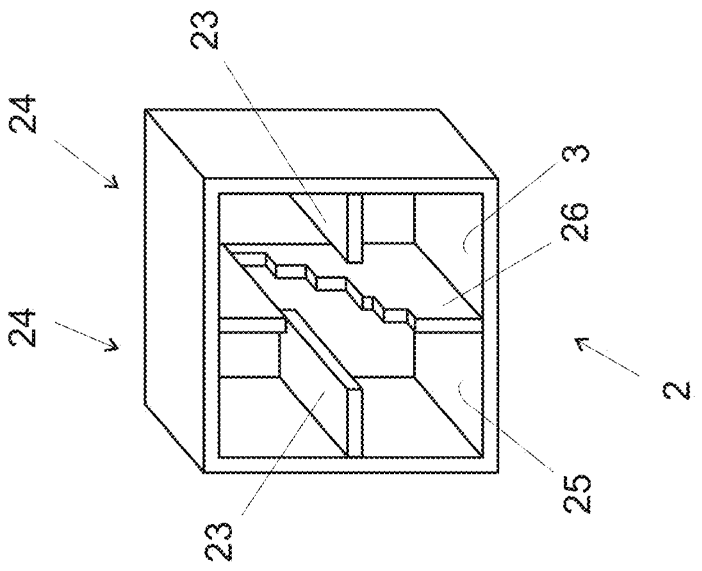
FIG. 4 illustrates a section of a waveguide device according to an aspect of the invention, having a square or rectangular cross-section and forming two ridged waveguides upstream converging into a single waveguide with four ridges downstream.

FIGS. 4 to 6 illustrate sections of waveguide devices respectively square, octagonal and circular. Other sections, including hexagonal, elliptical, semicircular oval, or semi-elliptical sections may be used.

These devices 2 can constitute for example polarizers and be used in isolation, or in an array in a component 1 such as a DRA antenna for example.

The devices of these figures having two inputs 24, for example two upstream inputs, separated by a vertical septum 26 on the figure and juxtaposed to the left and right of this septum at the back of the figure. Only one output 25 is provided, for example one upstream output, at the front of the figure. The inner face 3 of each of the two inputs is provided with a single ridge 23. The output 25 at the front of the figure is provided with three ridges 23 and a septum 26 spaced 90° apart. The two inputs can individually extend into a waveguide with a rectangular cross-section with one ridge.

The output can extend into a waveguide with a square section with four ridges, or be connected to a waveguide with this section. The device 24 allows to generate two signals which after their passage through the septum will have two distinct polarities, or conversely to join two signals corresponding to the two received polarities.

Figure 9:
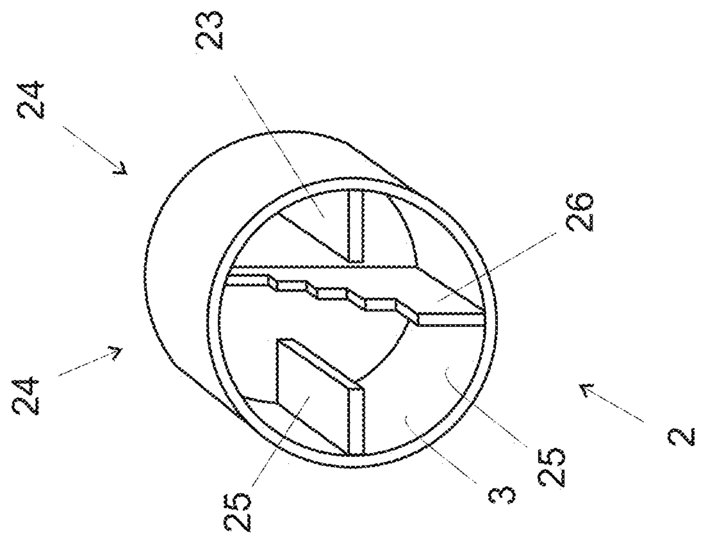
FIG. 9 illustrates a section of a waveguide device according to an aspect of the invention, having an octagonal cross-section, and forming two upstream ridged waveguides converging into a single downstream waveguide with three ridges.
Figure 8:
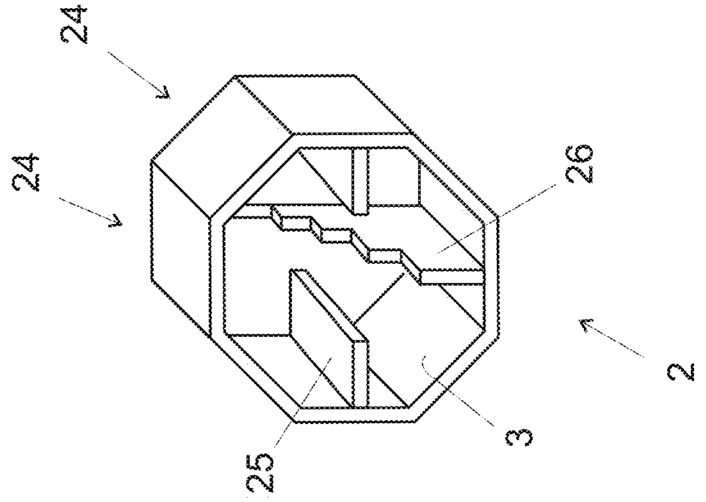
FIG. 8 illustrates a section of a waveguide device according to an aspect of the invention, having a hexagonal cross-section, and forming two upstream ridged waveguides converging into a single downstream waveguide with three ridges.
Figure 7:
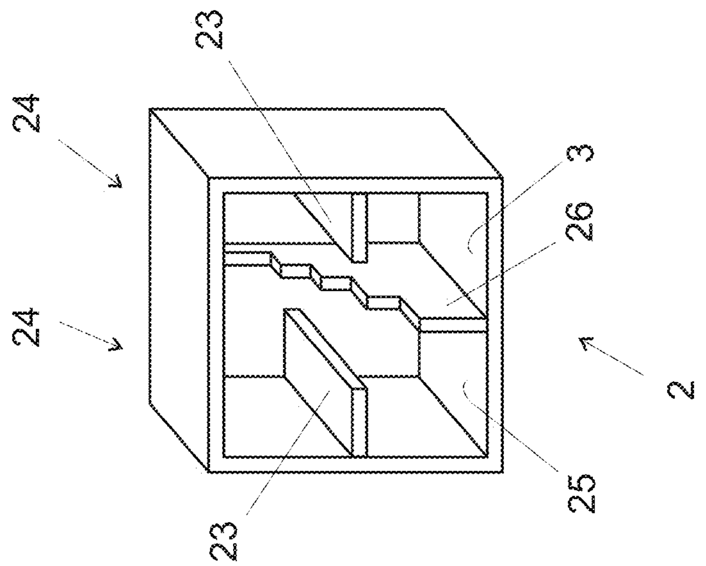
FIG. 7 illustrates a section of a waveguide device according to an aspect of the invention, having a square or rectangular cross-section, and forming two upstream ridged waveguides converging into a single downstream waveguide with three ridges.

FIGS. 7 to 9 illustrate sections of waveguide device respectively square, hexagonal and circular. Other sections, including octagonal, elliptical, semicircular oval or semi-elliptical sections may be used.

These devices may constitute, for example, polarizers and be used in isolation, or as an array in a component of the type of DRA antenna for example.

The devices in these figures have two inputs 24, for example two upstream inputs, separated by a vertical septum 26 on the figure and juxtaposed to the left and right of the device at the back of the figure. Only one output 25 is provided, for example one upstream output, at the front of the figure. Each of the two inlets is provided with a single ridge 23. The output 25 at the front of the figure can be connected to a waveguide with three ridges spaced 90° apart. The two inputs can individually extend into a waveguide with a rectangular section with one ridge, or be connected to a waveguide with this section. The device thus constitutes a polarizer and allows to join two signals of distinct polarity into a single signal combining the two polarities, or conversely to separate a signal into two signals of distinct polarity, and to be connected to ridged waveguides.

Figure 10:
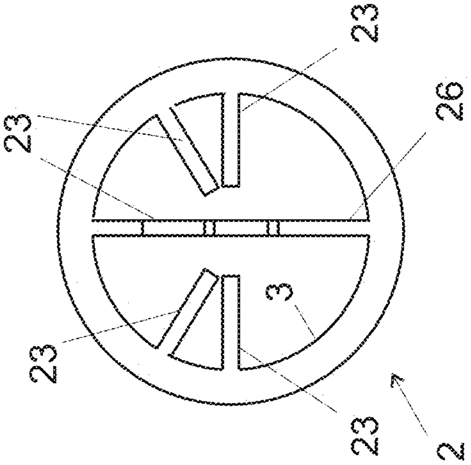
FIGS. 10 to 12 show different views of a waveguide device with a rearrangement of ridges and a different number of ridges upstream and downstream, with the ridges gradually disappearing.
Figure 11:
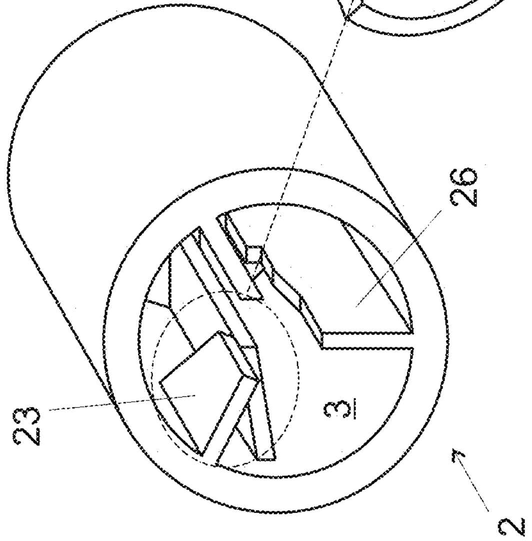
Figure 12:
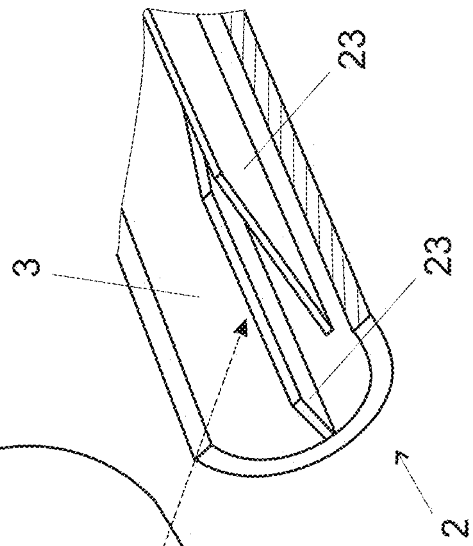

FIGS. 10 to 12 show three views of a portion of a circular-section waveguide device; again, the section could be different and any of the other sections described in this application can also be implemented with this embodiment. The inner face 3 of the device is provided with a septum 26 in order to separate a signal into two polarizations, and with ridges 23 whose height progressively reduces from the downstream end, until it disappears completely before the upstream end. Other ridges 23 are formed between the upstream and downstream ends of the device, and their height gradually increases. This configuration makes it possible to replace an arrangement of ridges at the upstream end, for example four ridges spaced at 90°, with another arrangement of ridges at the downstream end, for example three ridges spaced at 120°. In this way, the number of ridges and/or their angular spacing between the two ends can be changed, in order to connect them to waveguides or other devices with suitable configurations of ridges.

Figure 15:
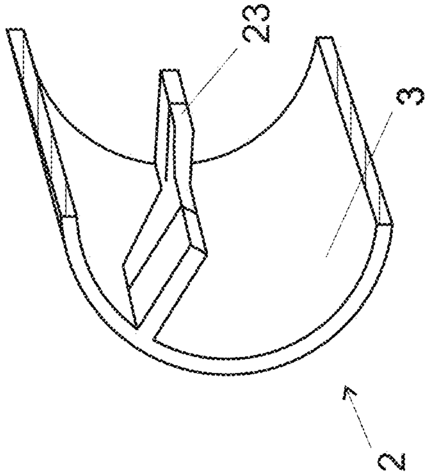
FIGS. 13 to 15 show different views of a waveguide device with a rearrangement ridges and a different number of upstream and downstream ridges, with the ridges being curved.
Figure 14:
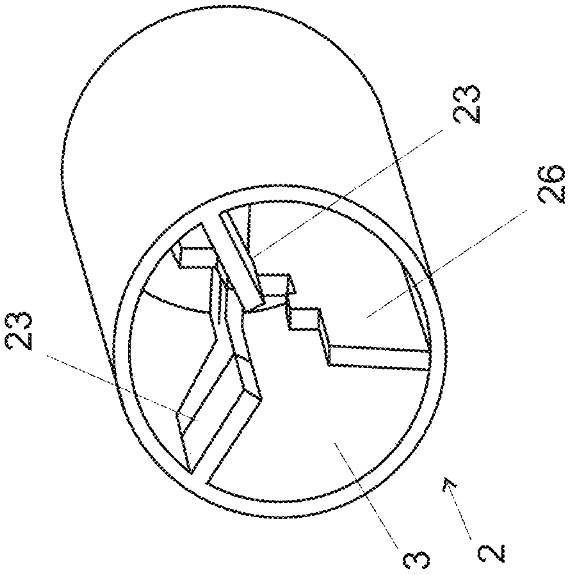
Figure 13:
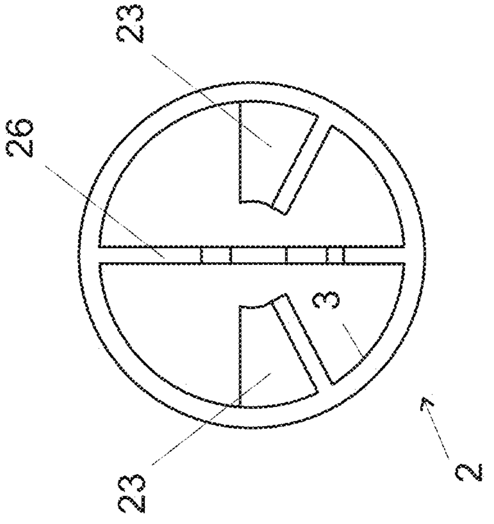

FIGS. 13 to 15 show three views of a portion of a circular-section waveguide device; again, the section could be different and any of the other sections described in this application can also be implemented with this embodiment. The inner face 3 of the device is provided with a septum 26 in order to separate a signal into two polarizations, and with curved 23 ridges, i.e. ridges that instead of extending in a radial direction as in most of the examples described above, are curved. This curved ridge has two walls which are non-planar but nevertheless parallel to each other. It is also possible to have a similar configuration but with non-parallel ridge faces.

The same ridge can thus lead to different axial positions upstream and downstream, which makes it possible to modify the phases of the ridges, and/or their relative phase shifts.

The embodiments described above can be used independently or in combination. For example, the devices 2 described individually in relation to FIGS. 4 to 15 may all be used either individually or in connection with one or more waveguide devices connected upstream and/or downstream, and/or combined in a single component with several devices of the same or different types. These devices in FIGS. 4 to 15 may for example be used as an antenna, polarizer or waveguide between the active part of a component grouping several antennas, and the individual antennas of this component. In addition, the features of these devices can be combined with each other; for example, it is possible to provide devices with curved ridges of variable height.

A radio-frequency component may, for example, be designed by grouping several devices according to one of FIGS. 4 to 15, or according to a combination of these devices, so as to transmit signals between the active components and the radiating elements. As shown in FIG. 1, these different devices can be oriented differently. In any case, the orientation of the ridges 23 on the downstream openings 25 may be different between the different devices 2 of such a component 1.

The invention claimed is:

1. Radiofrequency antenna array comprising several waveguide devices for transmitting and/or receiving electromagnetic signals, the radiofrequency antenna array comprising several ridges, each waveguide device comprising:
- at least one inner wall;
- a first layer comprising at least one radiating element, each radiating element including a downstream opening in a direction of propagation of said emitting signals,
- a fourth layer comprising at least two upstream openings in the direction of propagation of said signals during emission linked to said downstream opening so that said emitting signals are transmitted from said upstream opening to said downstream opening;
- a second layer for connecting the first layer to the fourth layer, said second layer forming a beamforming network,
- wherein the arrangement of ridges in the downstream openings of each waveguide device comprises no more and no less than three ridges,
- and wherein the number of ridges in each upstream opening of at least one waveguide device is different from three,
- and wherein in each waveguide device, a first ridge in the downstream opening extends in said direction of propagation to the upstream openings so as to form a septum.

2. Radiofrequency antenna array of claim 1, wherein the arrangement of the ridges in the at least two upstream openings of at least one said device is different from the arrangement of the ridges in the downstream opening of the same device.

3. Radiofrequency antenna array of claim 2, wherein the component is a polarizer provided with a septum, for example a septum of variable height forming staircase steps, enabling circular polarization to be obtained.

4. Radiofrequency antenna array of claim 1, wherein the orientation of the ridges in the downstream openings of the different devices is different.

5. Radiofrequency antenna array of claim 4, the arrangement of downstream ridges reducing the mutual coupling between signals transmitted or received by the different radiating elements.

6. Radiofrequency antenna array of claim 1, wherein the angular space between the different ridges of the at least two upstream openings of a device is different from the angular space between the ridges of the downstream opening of this device.

7. Radiofrequency antenna array of claim 1, wherein at least one of said ridges is curved.

8. Radiofrequency antenna array of claim 6, wherein at least one of the ridges has two walls parallel to each other, said walls being curved.

9. Radiofrequency antenna array of claim 8, each ridge opening into said downstream opening of the device and into said upstream opening of the device in a radial plane.

10. Radiofrequency antenna array of claim 1, wherein the radial position of the ridges of the at least two upstream openings of at least one said device is different from the radial position of the three ridges of the downstream opening of this device.

11. Radiofrequency antenna array of claim 1, wherein the height of at least one of the ridges of at least one said device varies over at least a portion of the length of this ridge.

12. Radiofrequency antenna array of claim 1, wherein the array is obtained by additive manufacturing and forms a single monolithic element.

13. Radiofrequency antenna array of claim 1, comprising at least four of said devices, the at least eight upstream openings of the different devices being in a first plane, the downstream openings of the different devices being in a second plane parallel to the first plane.

14. Radiofrequency antenna array of claim 13, wherein the at least four radiating elements are arranged so as to form a rectangular matrix.

15. Radiofrequency antenna array of claim 14, wherein adjacent radiating elements share a common wall.

16. Radiofrequency antenna array of claim 13, comprising at least forty said devices.

17. Radiofrequency antenna array of claim 13, wherein the orientation of the ridges between adjacent radiating elements is out of phase.

18. Radiofrequency antenna array of claim 13, each said downstream opening being at least partially surrounded by a rim to minimize mutual coupling between radiating elements.

19. Radiofrequency antenna array of claim 13, each downstream opening gradually widening in the downstream direction forming several steps.

20. Radiofrequency antenna array of claim 13, each downstream opening being ridged, the height of said ridges gradually decreasing in the downstream direction forming several steps.

* * * * *